United States Patent [19]

Fletcher et al.

[11] 3,781,549

[45] Dec. 25, 1973

[54] USE OF THIN FILM LIGHT DETECTOR

[76] Inventors: James C. Fletcher, Administrator of the National Aeronautics and Space Administration with respect to an invention of; George W. Lewicki, Studio City; Joseph Maserjian, La Crescenta, both of Calif.

[22] Filed: May 31, 1972

[21] Appl. No.: 258,152

Related U.S. Application Data

[63] Continuation of Ser. No. 88,435, Nov. 10, 1970, abandoned.

[52] U.S. Cl. ............ 250/211 J, 250/214, 317/235 N
[51] Int. Cl. ............ H01j 39/12
[58] Field of Search ............ 250/211 R, 211 J, 250/214, 213 R, 213 JT, 199; 317/235 N; 313/108; 307/311; 332/7.51

[56] References Cited

UNITED STATES PATENTS

| | | | |
|---|---|---|---|
| 3,329,823 | 7/1967 | Handy | 250/213 R |
| 3,193,685 | 7/1965 | Burstein | 317/235 N |
| 3,292,058 | 12/1966 | Haas | 317/235 N |
| 3,501,638 | 3/1970 | Compton | 250/213 R |

*Primary Examiner*—James W. Lawrence
*Assistant Examiner*—D. C. Nelms
*Attorney*—Monte F. Mott et al.

[57] ABSTRACT

A photovoltaic cell structure having a trapezoidal barrier is disclosed. An aluminum, magnesium or tantalium base is vapor deposited on a quartz substrate to a thickness of about 40 to 60 A. An oxide or nitride film of the base metal is produced as an insulator by reaction in a glow discharge plasma to a thickness of less than 100 A (typically 30 to 60 A), and a metal, preferably, gold counter-electrode is vapor deposited on the insulating layer. A bias generator of high impedance is employed to set and shift or modulate the spectral response of the structure.

2 Claims, 5 Drawing Figures

*INVENTORS.*
JOSEPH MASERJIAN
GEORGE W. LEWICKI

*BY* Paul F. McCaul
Monte F. Mott
ATTORNEYS.

INVENTORS.
JOSEPH MASERJIAN
GEORGE W. LEWICKI
BY Paul F. McCaul
Monte F. Mott
ATTORNEYS.

*INVENTORS.*
JOSEPH MASERJIAN
GEORGE W. LEWICKI
*BY*
Paul F. McCaul
Monte F. Mott
ATTORNEYS.

*INVENTORS.*
JOSEPH MASERJIAN
GEORGE W. LEWICKI
*BY*
ATTORNEYS.

NEW USE OF THIN FILM LIGHT DETECTOR

ORIGIN OF INVENTION

This is a continuation of application Ser. No. 88,435 filed Nov. 10, 1970, now abandoned. The invention described herein was in the performance of work under a NASA contract and is subject to the provisions of section 305 of the National Aeronautics and Space Act of 1958, Public Law 85–568 (72 Stat. 435; 42 USC 3457).

BACKGROUND OF THE INVENTION

This invention relates to ultra-violet (UV) radiation detectors, and more particularly to thin film metal-insulator-metal (MIM) structures for use as UV radiation detectors and as UV spectrometers.

Metal-semiconductor-metal (MSM) structures which rely on the Schottky theory have been employed as photovoltaic cells. Such a structure is described by Walter Schottky in U.S. Pat. No. 2,040,632. The structure consists of a semiconductor layer of cuprous oxide upon a copper base. According to the Schottky theory, the interface of the copper and cuprous oxide layer forms a low threshold rectifying junction. When light passing through the copper impinges upon that interface, a photoelectric current is produced through the junction. To complete a circuit for the current, a metal layer is provided as a counter-electrode on the surface of the cuprous oxide opposite junction.

Although the counter-electrode could be made light pervious, it is preferable to make the base electrode light pervious in order for the incident light being measured to reach the junction without significant attenuation. This was found necessary because the cuprous oxide layer absorbs light very strongly. Moreover, the degree of absorption was found to vary with color. For that reason, and because other devices can be used in the visible light range with equal or better results, the Schottky barrier devices using cuprous-oxide as a semiconductor have not come into widespread use.

Other semiconductor materials have been suggested for photovoltaic cells having a Schottky (space charge) barrier. For example in a U.S. Pat. No. 3,274,030, Robert E. Salomon suggests zirconium or niobium as the base, and an anodized surface of the base as the semiconductor. In the preferred embodiment, the base is relatively thick, and the counter-electrode is vapor deposited to form a semitransparent metal layer. Both zirconium and niobium used in that manner provide cells having primary sensitivity in the UV region.

Aside from the characteristics already referred to, an MSM structure has the further characteristic that its wavelength range of primary sensitivity is determined by the choice of materials and process selected. Once the structure has been manufactured, the form of the Schottky barrier is fixed, and so is its spectral response characteristic. For some applications, it would be desirable to be able to selectively shift the spectral response of the device, and to sometimes modulate the spectral response.

SUMMARY OF THE INVENTION

An object of the invention is to provide a structure for a photovoltaic cell which permits obtaining a selected shift of its entire spectral response while in use.

Still another object of the invention is to provide a structure for a photovoltaic cell which permits internal modulation of its spectral response in order to be able to use lock-in amplifier techniques for detection.

Still another object is to provide a new and improved photovoltaic cell having primary sensitivity in the UV region.

These and other objects of the invention are achieved by a structure comprising a thin film of metal as a semitransparent base electrode and a thin insulating layer formed as an oxide or nitride of the base metal. A counter-electrode film, which may be thicker than the base and the insulating layer, completes the structure. The base and counter-electrode metals are selected to provide suitable trapezoidal energy barriers at the interfaces with the insulating layer; and the insulator is selected to provide a suitable energy gap. A DC bias voltage applied across the structure can shift the energy barriers at the interfaces relative to each other, thereby shifting the spectral response. By superimposing an AC voltage, the electrical signal obtained from the structure can be modulated.

DESCRIPTION OF PREFERRED EMBODIMENTS

Figure 1:
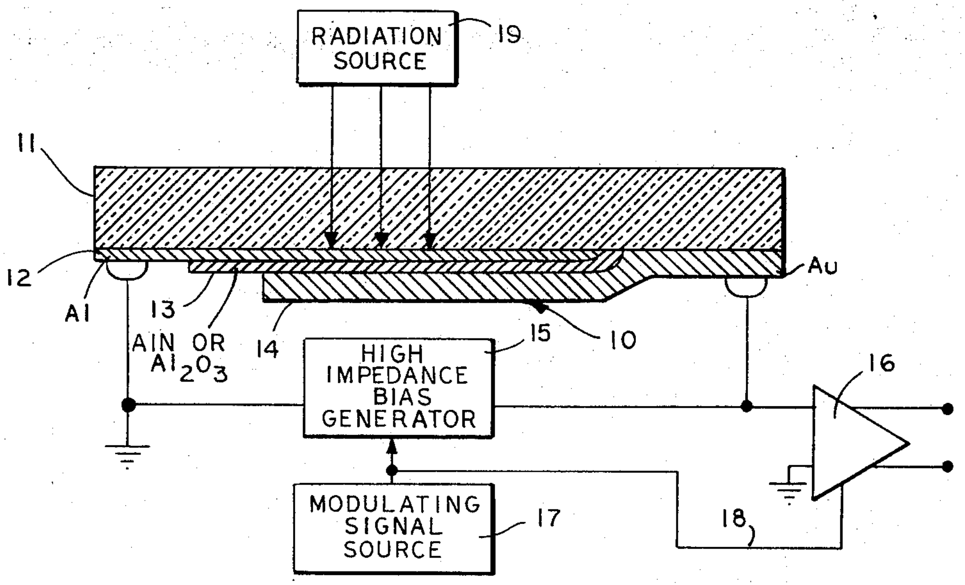
FIG. 1 is a diagrammatic illustration of the present invention showing an enlarged cross-section of a metal-insulator-metal structure.

Referring now to FIG. 1, a typical metal-insulator-metal (MIM) structure 10 is provided according to the invention on a substrate 11 of transparent material, such as quartz. A metal base electrode 12 is vapor deposited on the substrate to a thickness of about 40 to 60 A in order that it be semitransparent to radiation. A rapid-flash deposition technique is preferred in order that a uniform and well formed film be provided.

In practice, the material used for the base electrode can be any metal, such as aluminum, magnesium or tantalium, reactive with a gas to form a thin insulating layer 13 about 30 to 60 A thick, and not more than about 100 A. The preferred gases are oxygen and nitrogen, and reaction is preferably carried out in a glow discharge plasma. Using aluminum for the base, the insulator is then preferably aluminum oxide or aluminum nitride.

A layer thicker than about 100 A would not be suitable because a thicker layer leads to excessive scattering of photoelectrons and a corresponding reduction in photoelectric yield even when formed in a reaction in a glow discharge type plasma. The impedance of the layer also becomes greater than can be effectively used with practical amplifiers. As will be more fully appreciated from the following description of operation, it is very important that the insulating quality of the layer 13 be preserved. Otherwise the structure would have excessive scattering of photoelectrons and too low an internal impedance for a given thickness.

A second metal layer 14 is vapor deposited to a thickness of a few hundred Angstroms. This layer, referred to hereinafter as a counter-electrode, is selected to provide a desired high trapezoidal barrier. Suitable metals are aluminum, magnesium, lead and gold. The latter is preferred because it provides the highest trapezoidal barrier, and the highest possible trapezoidal barrier is desired in order to have a wide range over which the barrier height may be varied by a bias potential from a high impedance generator 15. A bias may then be used to shift and/or modulate the spectral response of the device.

MIM devices made with an aluminum base and a gold counter-electrode exhibit primary sensitivity in the UV region with photoelectric yields greater than 1 percent, and can be used with or without bias. Without bias, the devices can be operated as simple bandpass radiation detectors. Although the photoelectric yield is low in comparison to some other types of radiation detection devices, the insulating layer 13 can be made to assure a high internal impedance so that, using an amplifier 16 with a high input impedance, a very high output voltage can be obtained for a small input signal.

As just noted, the use of a bias permits selectively shifting the spectral response of the device. That makes it possible to use the device as a spectrometer. If the bias generator is implemented as a voltage controlled signal source, a control signal from a source 17 may be used to control the spectral sweep of the spectrometer over a relatively small but effective range for space science use, such as in an exploratory space flight. However, even with a fixed bias, or no bias, such a device could also have utility as a UV lamp monitor, as a UV meter in industrial laboratories, UV mapping of earth features for earth resources studies and for image dissectors for objects rich in UV radiation.

It is important that the bias generator have high internal impedance comparable to the measured high impedance of the device. Otherwise, the sensitivity of the device is reduced in direct proportion to the impedance of the generator.

A variable bias may be used to internally modulate the photoelectric signal of the MIM structure in order to use a lock-in amplifier technique for detection. Such a technique enhances the signal-to-noise ratio and thus improves its versatility as a radiation detector. The amplifier 16 would then be implemented as a lock-in amplifier, and receive as a reference signal the output of the control signal source 17 over a lead 18. The lock-in amplifier technique provides a more sensitive detector.

Before describing the operation of an exemplary MIM structure, it should be noted that the discussion applies to all structures made in accordance with the present invention, and not just to UV sensitive structures. MIM structures having primary response in the visible range could be provided by simply selecting proper materials for the trapezoid barrier that yield the desired response. However, since other types of radiation detectors which operate in the visible range are known and widely used, the present invention will find greatest use in UV applications.

Figure 2:
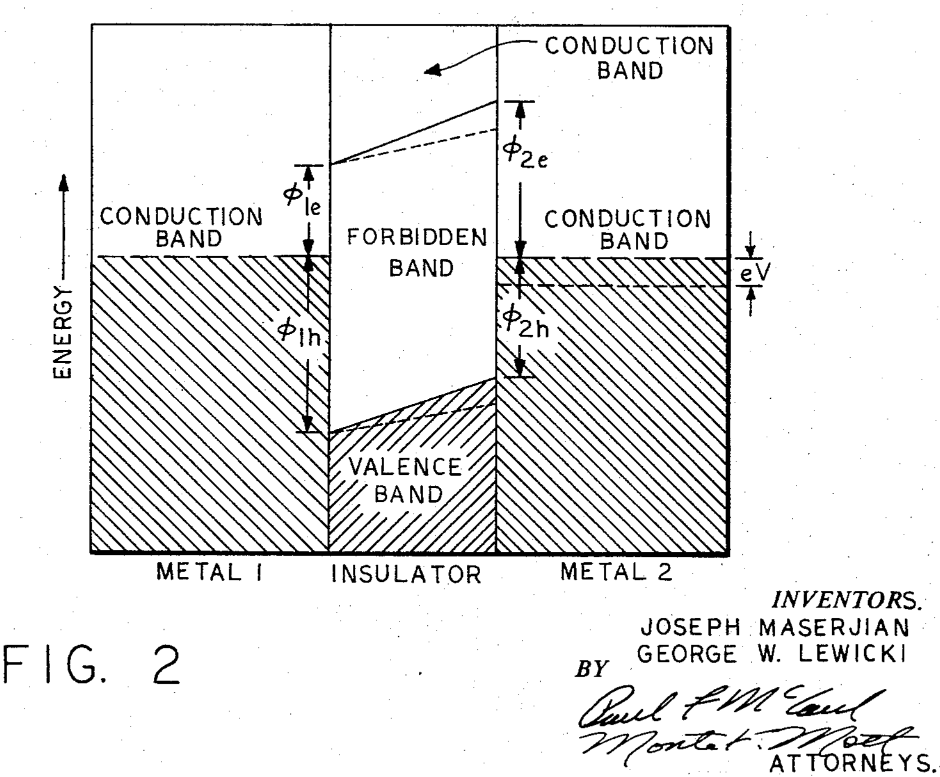
FIG. 2 is an electron-potential diagram of an exemplary metal-insulator-metal structure.

Operation of the structure may be comprehended for a discussion in terms of conventional energy band representations shown in an electron-potential diagram in FIG. 2. The forbidden band of the insulator acts as an energy barrier to electrons within the metals. Electrons can pass from metal to metal only via the conduction band or the valence band of the insulator. Normally, very few electrons within the metals have sufficient energy to propagate through the insulator conduction band due to the height of the trapezoidal barrier provided by the selection of the metals, while electrons having sufficiently low energies to propagate freely through the insulator valence band find very few unoccupied states (holes) within the opposite metal.

Light incident on the metals and the insulator can excite electrons to sufficiently high energies (or from sufficiently low energies for hole excitation) to allow passage of electrons from metal to metal through the conduction band (or valence band), i.e., light can give rise to photocurrents in MIM structures which do not depend upon tunneling through the forbidden band.

The threshold energies for photons giving rise to photocurrents depend on the barrier energies $\phi_{1e}$, $\phi_{1h}$, $\phi_{2e}$, $\phi_{2h}$ and the insulator forbidden energy gap $E_g$, where $\phi_{1e} + \phi_{1h} = 2e + \phi_{2h} = E_2$. The barrier height $\phi_{2e}$ set by the selection of the metal 2, such as gold for the counter-electrode 14, determines the spectral response of the device. To shift the spectral response, the Fermi level may be shifted by a bias voltage applied to the metal 2, thereby raising or lowering the barrier height $\phi_{2e}$ in the diagram, i.e., raising or lowering the threshold energy for conduction as the trapezoidal barrier is changed, such as to the form indicated by dotted lines in response to a positive bias potential ($e$V).

Figure 3:
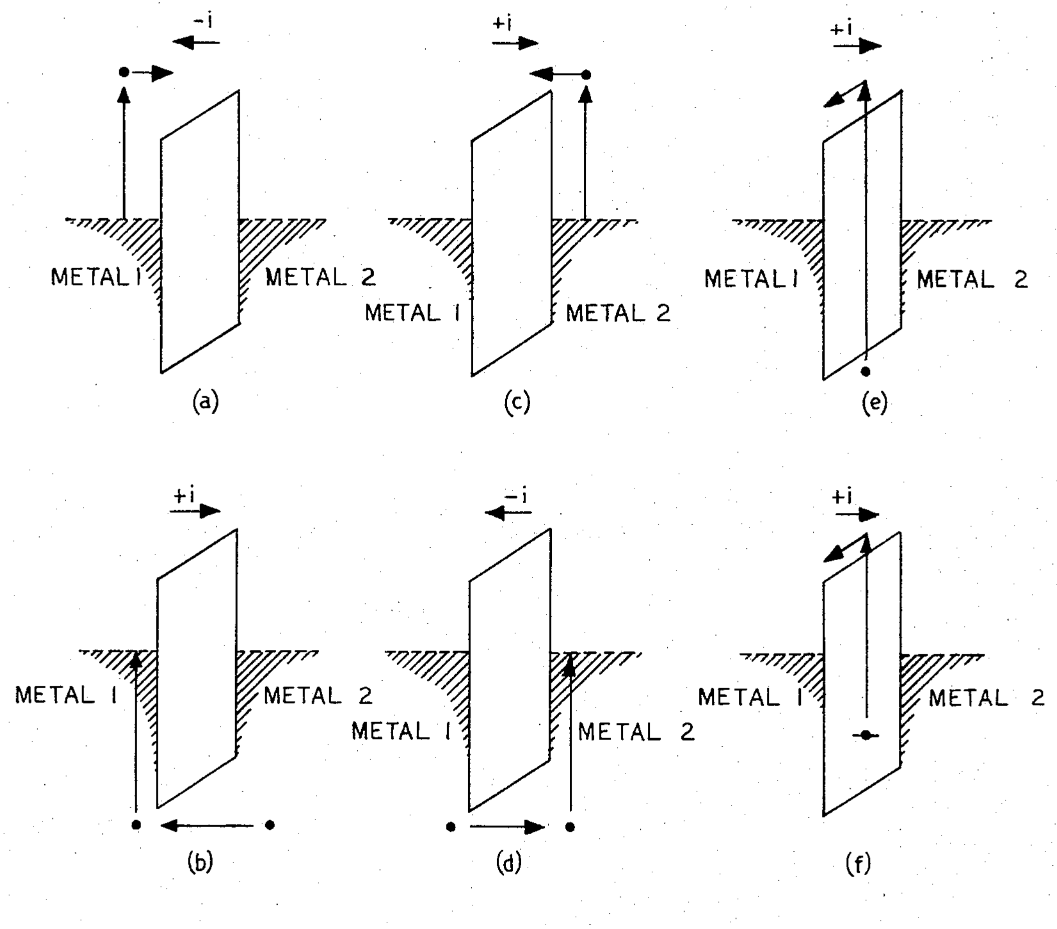
FIG. 3 shows six diagrams (*a* through *f*) which illustrate graphically different ways by which photoexcitation can take place in a metal-insulator-metal structure having a trapezoidal barrier.

There are six photoexcitation processes which can take place. Each one of these gives rise to a photocurrent which ideally increases above threshold with the dependence.

$$Y = I/eS = a\ (h\nu - \phi)^2 \quad (1)$$

where photoelectric yield Y is defined as the ratio of photocurrent I to that product of the incident photon flux S and the electron charge $e$. The quantity $h\nu$ (the product of Planck's constant and photon frequency) is the photon energy, $\phi$ is the threshold energy for the process, and $a$ is a constant coefficient. All six processes are illustrated in FIG. 3. Electrons can be photoexcited in metal 1 to cross over into metal 2 (diagram $a$) through the conduction band. Conversely, electrons can be photoexcited in metal 2 to cross over into metal 1 (diagram $c$) through the conduction band. The two processes give photocurrents of opposite polarities; the photon threshold energy is the greater $\phi_{1e}$ and $\phi_{2e}$ in both cases.

Electrons can be excited from deep levels in metal 1 leaving behind holes. These holes are filled by electrons originating in metal 2 crossing through the valence band of the insulator. This process can be considered as photoexcitation of holes in metal 1, the holes crossing over to metal 2 (diagram $b$). The inverse process involves holes being photoexcited in metal 2, the holes crossing over into metal 1 (diagram $d$). These last two processes give rise to photocurrents with opposite polarities with a photon threshold energy equal to the greater of $\phi_{1h}$ and $\phi_{2h}$ in both cases.

Finally, there is a possibility of electrons being excited from the valence to the conduction band of the insulator with a threshold energy $E_g$, the resulting holes and electrons moving into the metals under the influence of the built-in field within the insulator (diagram e). Electrons could also be excited from discrete states within the insulator with a threshold energy less than $E_g$ (diagram *f*). The latter two processes can normally be ruled out of consideration because of the large threshold energies involved with wide band gap insulators (e.g., $Al_2O_3$ and AlN). These processes would only occur in the far ultra-violet region of the spectrum and thus would not normally be transmitted by the substrate 11.

The processes illustrated in diagrams *a* to *d* of FIG. 3 which occur at the metal-insulator barriers ($\phi_{1e}$, $\phi_{1h}$, $\phi_{2e}$ and $\phi_{2h}$) can be reduced to one dominant process by a suitable combination of materials, thickness and applied bias voltage. For example, the use of a very thin aluminum base electrode (≈50A) increases the intensity of photon flux transmitted to the counter-electrode and thus increases the photoresponse originating from that electrode. If in addition, a metal is chosen for the counter electrode which has a high photoelectric efficiency, the dominant process will correspond to either holes or electron photoexcitation from that electrode as illustrated in diagrams *c* and *d*. For a given choice of insulator and metal, normally only one type of current (either hole or electron) dominates. In a few cases, both have been observed to be of the same order of magnitude. Such cases can be identified by analyzing the effect of two photocurrents of opposite polarity, each with a different threshold energy.

Figure 4:
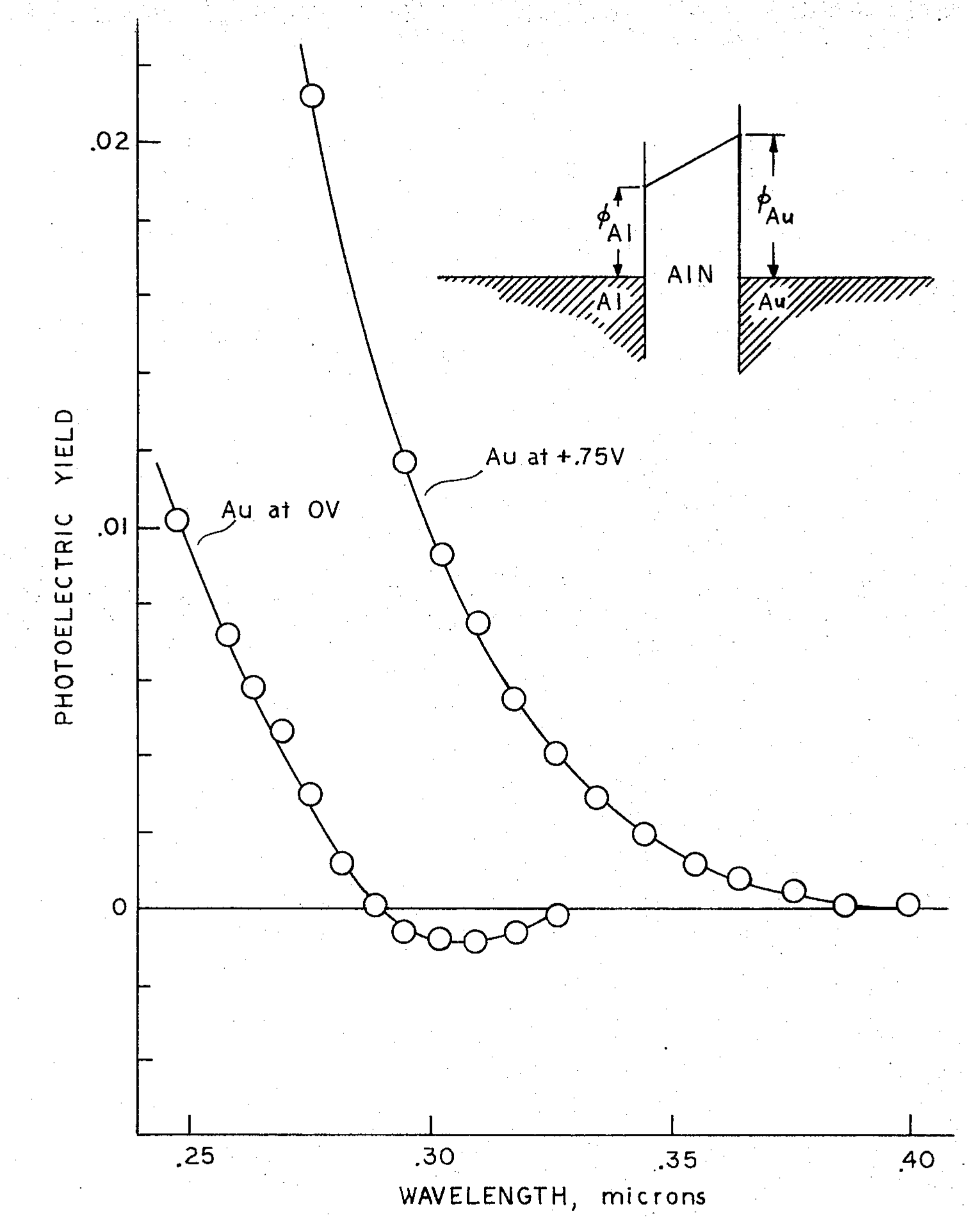
FIG. 4 is a graph of photoelectric yield as a function of wavelength for an exemplary metal-insulator-metal structure.

To illustrate the kind of photoresponse which is most useful for a UV radiation detector and for a spectrometer, results obtained with an Al-AlN-Au structure are shown in FIG. 4. In this particular case, the dominant process is, as illustrated in diagram *b* of FIG. 3, photoexcitation of holes from the hold electrode (having the barrier $\phi_{2h}$ in FIG. 2 equal to 3.03*e*V). At zero applied voltage, a small negative current is observed near threshold which corresponds to a small contribution of holes photoexcited from the aluminum electrode as illustrated in diagram *d* of FIG. 3. This reverse process becomes completely negligible when a positive bias voltage is applied across the device (the gold electrode positive). The primary effect of the positive bias voltage V is to shift the threshold for holes photoexcited from the gold to a lower energy $\phi$, that is $$\phi = \phi_{2h} - eV \tag{2}$$

until the minimum of $\phi_{2h}$ is reached.

For the Al-AlN-Au structure, the threshold thus can be varied with an applied voltage from a maximum energy of $\phi_{1h}$ equal to 3.78*e*V to a minimum energy $\phi_{2h}$ equal to 3.03 *e*V. In terms of photon wavelengths (equal to 1.24/h$\nu$ microns where $h\nu$ is expressed in *e*V) the range of thresholds is 0.328 to 0.409 microns. The results in FIG. 4 follow the theoretical dependence predicted by equations (1) and (2) which make such MIM structures suitable for UV spectrometers. They also exhibit sufficiently good photoyields (> 1 percent) at the shorter wavelengths for use as UV detectors. Somewhat larger photoyields have also been observed in $Al_2\theta_3$-Au structures.

Although it is doubtful that the photoyields in MIM structures will ever reach values as high as 20 percent, which is typical of some quantum detectors, some improvement in yield is possible with optimum structures. Offsetting the sacrifice in yield is the higher internal impedance which can be obtained in such structures (e.g. $10^8$ ohms). Since the signal is proportional to the photocurrent multiplied by the impedance while noise is proportional to the square root of the impedance, such structures can offer a greater net advantage. In addition, the structures are simplified, rugged, produceable in any desired configuration by masking techniques, and suitable for fabrication in imaging arrays.

The suitability for possible use in spectrometers referred to hereinbefore is explained in the following discussion. It can be assumed that photons above some maximum photon energy W will not be transmitted by the substrate. The total open circuit photovoltage $V_p$ is clearly the product of the device resistance R times the total photocurrent; the latter is just the integral of I in equation (1) over all photon energies in the range from $\phi$ to W.

It therefore follows that $$V_p = aeR \int_{\phi}^{W} S(h\nu - \phi)^2 d(h\nu) \tag{3}$$

where the photoflux S is in general a function of h$\nu$ (or wavelengths) and R represents the quantity to be measured. Making use of equation (2) and differentiating equation (3) with respect to V, one obtains $$\frac{dV_p}{dV} = 2aeR \int_{\phi}^{W} S(h\nu - \phi) d(h\nu) \tag{4}$$

$$\frac{d^2V_p}{dV^2} = 2aeR \int_{\phi}^{W} Sd(h\nu) \tag{5}$$

$$\frac{d^3V_p}{dV^3} = 2aeRS\{h\nu = \phi\} \tag{6}$$

The above derivatives of equations (4) through (6) can be measured directly by applying a sufficiently small harmonic current $i_o e^{j\omega t}$ at angular frequency $\omega$ through the device and detecting the total voltage appearing across the device at the harmonic frequencies $\omega$, $2\omega$, and $3\omega$, using standard lock-in amplifier techniques. In general, it is also desirable to apply a DC bias across the device, which can be achieved by using a constant current source to apply a DC current $I_o$ through the device. Therefore, the total applied voltage V is R $(I_o + i_o e^{j\omega t})$ The total output voltage $V_{out}$ then includes the following terms:

$$V_{out} = V_P + I_oR + [1 + dV_P/dV]\, i_oR\, e^{j\omega t} + \tfrac{1}{2}\, d^2V_P/dV^2\, (i_oR)^2 e^{j2\omega t} + 1/6\, d^3V_P/dV^3\, (i_oR)^3 e^{j3\omega t} \tag{7}$$

Each harmonic term can be selectively measured in a very sensitive manner by lock-in amplifier techniques. If the third harmonic ($3\omega$) term of the output voltage is $v_3$, the photon flux S at energy $h\nu = \phi$ (or wavelength 1.24/$\phi$) is given by $$S\{h\nu = \phi\} = 3\ v_3/ae\ i_o^3R^4 \quad (8)$$

For the Al-AlN-Au structure, the spectral range over which S can be measured is 3.03 eV $< h\nu <$ 3.78 eV or from 0.328 to 0.409 microns. Thus, by obtaining the third derivative of the output signal using conventional lock-in amplifier techniques, a signal proportional to the photon flux is derived.

The second harmonic ($2\omega$) term $v_2$ of the output voltage also provides a very sensitive means of detecting the total photon flux in the range $\phi < h\nu < W$. One can obtain from equations (5) and (7)

$$\int_{\phi}^{W} Sd(h\nu) = v_2/aei_0^2R^3 \quad (9)$$

Thus the total photon flux may also be detected by lock-in amplifier techniques using only internal modulation, without the complications imposed by external chopping of the incident radiation, or the use of other electro-mechanical techniques. This advantage may more than outweigh the disadvantage of lower photon yields. On the other hand, the simplest scheme indicated previously of just measuring the DC value of $V_p$ (with neither AC nor DC bias) should be useful for many UV detection applications.

The importance of a thin film insulator (about 30 to 60 A, but not more than about 100 A) will now be described with reference to FIG. 5 using a structure of aluminum and magnesium for the base and counter-electrode, respectively, and an insulating layer of aluminum-nitrate of various thicknesses. The ordinate and abscissa selected for the graph are the square root of Y and h$\nu$ because the usual method for photoelectrically determining barrier energies involves plotting measured values of the square root of Y as a function of h$\nu$, fitting a straight line to the data, the extrapolating this line to the photon energy for which the ordinate is zero. That photon energy is the barrier energy.

Figure 5:
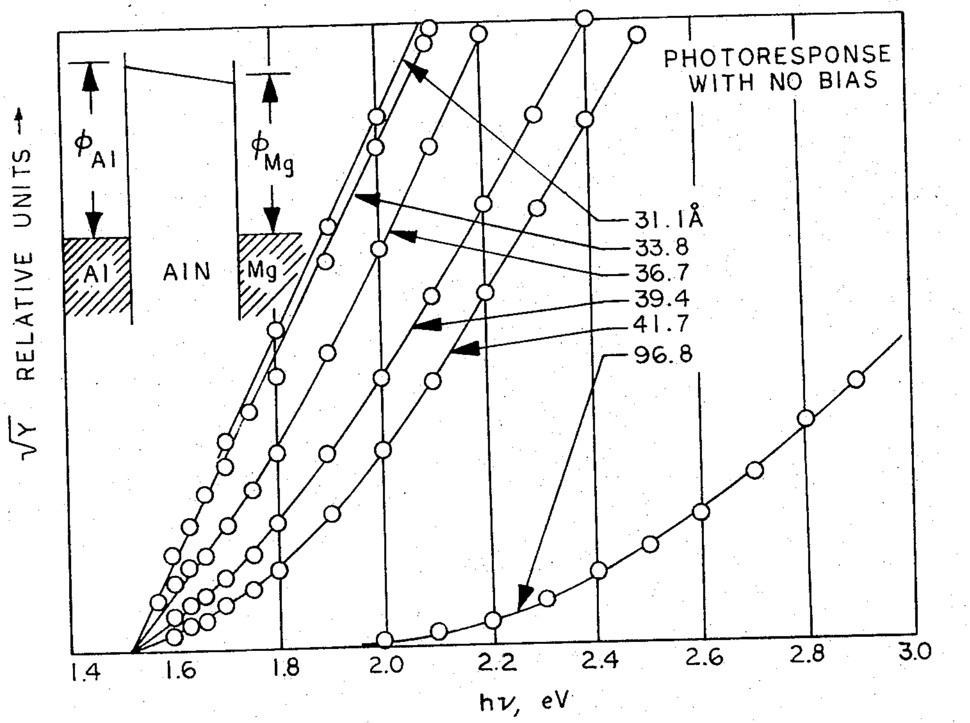
FIG. 5 is a graph of photoresponse data for exemplary metal-insulator-metal structures of various insulator thickness and with no bias potentials applied to the electrodes.

In FIG. 5 are shown room-temperature plots of $Y^{1/2}$ as a function of photon energy h$\nu$ in Al-A1N-Mg structures with insulator thicknesses ranging from 31 to 97 A, as determined from their capacitance. The measurements were taken with a double-pass grating spectrometer with the structures illuminated through this aluminum-base electrodes ($\approx$50 A thick). The thin-base samples gave relatively large photoelectric yields which, when combined with a high-intensity Xenon lamp and a sensitive amplifier, allowed measurements to be made very close to the true threshold.

From their polarity, we know that in this case the photocurrents to be mainly the result of electrons photoexcited in the base (Al) electrode. We also known that with no voltage applied to the counter-electrode (Mg), there is a slight built-in field that assists propagation of these photoexcited electrodes through the insulator conduction band (see inset of FIG. 5).

As the insulator thickness increases, the photoelectric yield has an intercept at the same photon threshold energy (1.53eV within experimental uncertainty) but does not give a straight line in a plot of $Y^{1/2}$ vs $h\nu$ over the whole range of data. From this and other similar data, we can say that the barrier energy at the Al-AlN interface is 1.53 eV and that it is independent of insulator thickness in the range of 30 A to at least 42 A.

The slopes of the curves shown in FIG. 5 are a rough measure of the second derivative of Y with respect to $h\nu$. Consequently the data tell us that, as generally expected from scattering, the transmission of photoexcited electrons decreases with increasing insulator thickness, this decrease being more pronounced for energies near the barrier energy than for higher energies. The degree of scattering is also sensitive to the quality of the insulator film. Thus it is important that high quality films be formed.

As noted hereinbefore, the data in FIG. 5 show that the threshold energy for photoresponse in Al-AlN-Mg structures is independent of insulator thickness, at least in the range of 31 to 42 A if not to 97 A; other data, not shown, increase the certainty of the upper limit to 50 A. This fact also gives assurance that within this thickness range there is insufficient space charge in the insulator to distort the barrier appreciably from a trapezoidal shape. This conclusion is in agreement with studies of tunneling currents in the aluminum base and aluminum-nitride insulator structure, and further distinguishes the structures of the present invention generally over Schottky-barrier devices which employ relatively thick semiconductor oxide layers formed from their base electrodes, rather than a thin insulating layer.

Barrier energies obtained from photoresponses in structures having aluminum, lead and gold substituted for the magnesium counter-electrode were consistent with the same value of 1.53 eV at the base and insulator interface and 1.72 eV, 2.1 eV and 2.4 eV at the insulator and counter-electrode interfaces. Barrier energies at the insulator and counter-electrode interfaces were found to vary almost directly with the electronegativity of the metal as predicted by theory. Photoresponse measurements on structures having an aluminum base and an aluminum oxide insulator yielded barrier energies somewhat lower than with structures having an aluminum base and an aluminum nitride insulator.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. The new use of a photovoltaic device for selectively detecting photon energy of incident light, measuring the total photon flux of incident light in a defined range between a maximum photon energy W and a lower energy $\phi$, and the photon flux at energy h$\nu$ equal to $\phi$, where said device is comprised of a film of a first metal sufficiently thin to be semitransparent, a thin film electrical insulator on the surface of said film of said first metal to a thickness of not more than 100 A, and a film of a second metal on said insulator, wherein said metals are selected for their characteristic energy barrier heights at their interface with said insulator to provide a trapezoidal barrier than determines the spectral response of said device, said new use comprising applying a bias voltage across said device from one metal film to the other, thereby to select said lower energy by applying a DC current $I_o$ through said device, superimposing a small harmonic current $i_o e^{j\omega t}$ on said bias current, whereby the total bias voltage V across said device is $R(I_o + i_o e^{j\omega t})$, where $R$ is the resistance through which said DC current and superimposed harmonic current are applied across said device, and selectively detecting the total voltage appearing across said device at one of the harmonic angular frequencies $\omega 2\omega$ and $3\omega$ using lock-in amplifier techniques, whereby while detecting at the angular frequencies $\omega 2\omega$ and $3\omega$, the detected output signal is proportional to the respective quantities of photon energy of incident light above said lower energy level $\phi$total photon flux in said range between $\phi$ and W, and the photon flux at energy $h\nu$ equal to $\phi$.

2. The invention as defined in claim 1 wherein said second metal is selected from a group consisting of aluminum, magnesium, lead and gold, and said first metal is selected from a group consisting of aluminum, magnesium and tantalium.

* * * * *